United States Patent
Kondo et al.

(10) Patent No.: US 9,895,728 B2
(45) Date of Patent: Feb. 20, 2018

(54) SALT CAVERN WASHING WITH DESALINATION AND RECYCLING OF WATER

(71) Applicant: ATHABASCA OIL CORPORATION, Calgary (CA)

(72) Inventors: Tad Jason Kondo, Calgary (CA); Gillian Clark, Calgary (CA); Bryan Armand Vandal, Okotoks (CA)

(73) Assignee: ATHABASCA OIL CORPORATION, Calgary, Alberta (CA)

( * ) Notice: Subject to any disclaimer, the term of this patent is extended or adjusted under 35 U.S.C. 154(b) by 0 days.

(21) Appl. No.: 15/180,912

(22) Filed: Jun. 13, 2016

(65) Prior Publication Data
US 2016/0361741 A1    Dec. 15, 2016

Related U.S. Application Data

(60) Provisional application No. 62/175,594, filed on Jun. 15, 2015.

(51) Int. Cl.
*E21C 41/16*    (2006.01)
*B09C 1/00*    (2006.01)
(Continued)

(52) U.S. Cl.
CPC ............ *B09B 1/008* (2013.01); *B09B 1/006* (2013.01); *B09B 3/0091* (2013.01); *B09C 1/02* (2013.01);
(Continued)

(58) Field of Classification Search
CPC ......... E21B 43/28; B09B 1/006; B09B 1/008; B09C 1/02; B09C 2101/00
(Continued)

(56) References Cited

U.S. PATENT DOCUMENTS 2,787,455 A    4/1957    Knappen
2,994,200 A    8/1961    Carpenter
(Continued)

FOREIGN PATENT DOCUMENTS

CA    2536937 A1    3/2005
CA    2536763 A1    6/2005
DE    10130454 A1    3/2003

OTHER PUBLICATIONS

International Search Report for corresponding PCT International Application No. PCT/CA2016/050682 dated Aug. 24, 2016.
(Continued)

*Primary Examiner* — Benjamin F Fiorello
*Assistant Examiner* — Stacy N Warren
(74) *Attorney, Agent, or Firm* — Heslin Rothenberg Farley & Mesiti, P.C.; Victor Cardona, Esq.

(57) ABSTRACT

A method for desalinating and recycling the brine exiting a salt cavern. This method reduces the overall make-up water demand to wash a salt cavern, eliminates the brine disposal well and controls the cavern growth rate during disposal operations. The method includes the steps of: a) desalinating brine emerging from the salt cavern, and creating a stream of saline water, a stream of non-saline water and a stream of salt; b) recycling the stream volumes and combining the stream of non-saline and saline water with make-up water, thereby reducing demand for make-up water, c) pumping the salinated water into the salt cavern, and controlling the rate of growth of the salt cavern while disposing of wastes in the cavern, and repeating steps a) and b) substituting the make-up water with a waste mixture.

21 Claims, 3 Drawing Sheets

(51) Int. Cl.
*B09B 1/00* (2006.01)
*C02F 1/52* (2006.01)
*B09B 3/00* (2006.01)
*B09C 1/02* (2006.01)
*B09C 1/06* (2006.01)
*C02F 103/10* (2006.01)

(52) U.S. Cl.
CPC .................. *B09C 1/06* (2013.01); *C02F 1/52* (2013.01); *B09C 2101/00* (2013.01); *C02F 2103/10* (2013.01)

(58) Field of Classification Search
USPC ........... 405/53, 55, 57, 58, 129.35; 299/3, 5; 588/250; 175/67
See application file for complete search history.

(56) References Cited

U.S. PATENT DOCUMENTS

| | | | |
|---|---|---|---|
| 3,632,171 A | | 1/1972 | French et al. |
| 3,676,078 A | * | 7/1972 | Jacoby ................. B01D 9/0031 159/902 |
| 4,072,472 A | * | 2/1978 | Lukes ................. B01D 9/0004 23/295 S |
| 4,192,555 A | | 3/1980 | Willett |
| 4,211,613 A | * | 7/1980 | Meckler ..................... C02F 1/14 159/902 |
| 4,249,833 A | | 2/1981 | Talley |
| 4,285,915 A | | 8/1981 | Saldick et al. |
| 4,401,635 A | * | 8/1983 | Frint ........................ C01D 7/00 23/302 T |
| 4,652,054 A | * | 3/1987 | Copenhafer ........... B01D 61/44 204/534 |
| 4,815,790 A | * | 3/1989 | Rosar ...................... E21B 43/28 166/245 |
| 5,004,298 A | | 4/1991 | Boulanger et al. |
| 5,588,713 A | * | 12/1996 | Stevenson ................ C01D 7/00 299/5 |
| 5,669,734 A | * | 9/1997 | Becnel, Jr. ............. E21B 43/281 299/3 |
| 5,955,043 A | | 9/1999 | Neuman et al. |
| 6,022,080 A | * | 2/2000 | Gruschow ................ C01D 3/06 299/4 |
| 6,137,028 A | | 10/2000 | Snow |
| 7,097,386 B2 | | 8/2006 | Maduell et al. |
| 7,156,579 B2 | | 1/2007 | Castle et al. |
| 2009/0309408 A1 | * | 12/2009 | Bishop ...................... F16L 9/19 299/5 |
| 2011/0206459 A1 | | 8/2011 | Tunget |
| 2014/0262739 A1 | * | 9/2014 | Fong ...................... F24J 2/0466 203/11 |

OTHER PUBLICATIONS

Written Opinion or corresponding PCT International Application No. PCT/CA2016/050682 dated Aug. 24, 2016.

Peterson, Guidelines for Produced Water Evaporators in SAGD, International Water Conference 2007 (IWC-07-68.

Brochure published by the Argonne National Laboratory for the U.S. Department of Energy, National Petroleum Technology Office, Sep. 1999, pp. 1-16.

* cited by examiner

SALT CAVERN WASHING WITH DESALINATION AND RECYCLING OF WATER

CROSS-REFERENCE TO RELATED APPLICATIONS

This application claims priority from U.S. Provisional Application Ser. No. 62/175,594, filed on Jun. 15, 2015, the entire disclosure of which is incorporated herein by reference in its entirety.

FIELD OF THE INVENTION

The invention relates to a method and system for developing caverns in salt formations, and more particularly for conserving water during cavern development. The resulting caverns are used for storage of wastes or hydrocarbon products.

BACKGROUND OF THE INVENTION

Man-made salt caverns are used to for storage of hydrocarbons or for disposal of wastes. Such caverns may be formed during salt-mining processes (also referred to as "solution mining," and "in situ leaching") where the recovered salts are useful products and the salt caverns are subsequently used for hydrocarbon storage or waste disposal. Alternatively, such salt caverns may be developed specifically for hydrocarbon storage or waste disposal. In the latter situation, the mined salts will often be disposed of. Some examples of soluble salts that can be extracted by solution mining to form a salt cavern include sodium chloride, potassium chloride and sodium sulfate, among others.

To form a salt cavern according to conventional methods, well-drilling equipment is used to drill a hole from the surface to the depth of the salt formation. The portion of the well above the salt formation is supported by several concentric layers of pipe known as casing to protect non-saline water zones and to prevent collapse of the hole. To form a salt cavern, the well operator pumps non-saline water through one of the pipes. As the cavern wash water comes in contact with the salt formation, the salt dissolves until the water becomes saturated with salt. The brine then returns to the surface. Cavern space is created by the removal of salt as a salt solution which is often referred to as "brine" whether it is saturated or not.

The two types of common subsurface salt deposits are salt domes and bedded salt. Salt domes are large, generally homogeneous formations of salt that are formed when a column of salt migrates upward from a deep salt bed, passing through the overlying sediments.

Bedded salt formations occur in layers bounded on the top and bottom by impermeable formations and interspersed with non-salt sedimentary materials (such as anhydrite, shale, and dolomite) with varying levels of impermeability.

Currently, salt caverns developed for hydrocarbon and waste storage are formed by a "once through" process, wherein saline water exiting the newly formed cavern is disposed of. In this process, the water entering the cavern is always under-saturated with salt. Therefore the water will continue to dissolve salt as it enters the cavern and consequently the cavern will continue to grow. Problems associated with this process include a need for installation of pipelines to supply water and disposal wells for disposal of brine. In addition, cavern lifetimes are reduced if their diameter grows to exceed recommended limits.

U.S. Pat. No. 2,787,455 to Knappen describes a method for forming underground reservoirs for the storage of gases or liquids, particularly petroleum products. The method includes the steps of drilling a hole into a soluble-rock formation, setting casing in the hole down to a point between a substantial distance above and a substantial distance below the top of the soluble-rock formation cementing the casing, lowering inlet and outlet tubing into the hole to a depth below the casing seat, forcing non-dissolving sealing liquid through the space between the tubing and the casing to a point below the casing seat, and pumping a solvent which is immiscible with and heavier than the sealing liquid to dissolve the rock of the formation. The solvent is withdrawn and dissolving or leaching is continued until a cavity of a predetermined size is produced. These steps may be repeated for different sections of a given formation.

U.S. Pat. No. 2,994,200 to Carpenter describes a method for making underground storage caverns. The method includes the steps of circulating through an underground formation a liquid which is a solvent for the formation, forming a recess in the roof of the formation, spotting liquefied petroleum gas in the recess, and continuing the circulation of the solvent to leach out a cavern while the roof of the cavern is shielded from the solvent by the presence of the layer of liquefied petroleum gas between the solvent and the roof of the cavern.

U.S. Pat. No. 3,632,171 to French and Slezak describes a method of controlling the growth of brine wells. The method is used in solution mining to obtain brine as a product. A substantially cylindrical cavity is formed in the solution mining of soluble deposits such as salt, by the use of an oil pad to separate the solvent from the overhead soluble in the developing cavity. A well is first drilled into the salt deposit and fitted to a depth of several hundred feet into the salt deposit with a cemented casing. The lower end of the casing establishes the eventual roof of the final cavity. Within the cemented casing, and concentric to it, are hung two strings of pipe, the inner one extending below the outer pipe to a point near the bottom of the drilled well. In operation, a solvent, such as water, is pumped in the annular space between the two strings of pipe. A water-immiscible petroleum liquid fraction of lesser density than water is pumped through the annular space between the cemented casing and the outer string of pipe to form an oil pad on the surface of the water. The petroleum liquid may be used to fill the cavity to any depth desired, to form an oil pad, thus protecting the exposed salt all the way down to the interface and exposing the salt below the interface to the action of the water.

U.S. Pat. No. 4,192,555 to Willett describes a method of disposing of solid sodium chloride while selectively performing solution mining of potassium chloride from a subterranean deposit containing potassium chloride and sodium chloride. An aqueous solvent saturated with respect to sodium chloride, unsaturated with respect to potassium chloride and slurried with solid sodium chloride, is fed into the deposit having a cavity wherein there is a face on which rich and lean potassium chloride ore is exposed. Potassium chloride is thereby dissolved while sodium chloride is deposited from the solvent slurry and the resultant solution withdrawn from the cavity enriched in potassium chloride.

U.S. Pat. No. 4,249,833 to Talley describes a method for depressurizing a leached salt cavern which includes an upper hydrocarbon blanket to protect the roof of a cavern. Depressurization of a cavern is required when measurements of the cavern, such as sonar measurements are required. To achieve depressurization, the following steps are carried out: (1) petroleum liquid is injected into the annulus between the leach strings (including an input string for non-saline water and an output string for brine), to the same depth as the petroleum liquid in the outer annulus, the long leach string, which is the central leach string, is open; and the displaced aqueous liquid moves up and out the central string; (2) a packer plug is then inserted in the central string to about this same level; and the aqueous liquid above the packer is replaced with petroleum liquid; and (3) the replacement of the aqueous liquid above the packer plug with petroleum liquid of lower density means that there is now a higher pressure on the underside of the plug than on the upper side; and this pressure is relieved through the plug through tubing to the surface, whereupon the packer plug is retrieved, leaving the well equalized.

U.S. Pat. No. 5,004,298 to Boulanger and Rousseau describes a method for preparing large cavities for abandonment. When an underground quarry or mine has been worked out, there remain underground voids which, in the absence of suitable support measures being taken, run the risk of collapsing and giving rise to ground subsidence which is damaging to surface infrastructure. Therefore, prior to ceasing to monitor cavities, it is appropriate to implement means suitable for avoiding any subsequent disturbance. The method includes the steps of injecting a mixture (which may include waste materials) with density greater than that of the brine, and the mixture being capable of setting, until the cavity is completely filled with the mixture and the brine is displaced; maintaining communication between the outside and the filled cavity during a waiting period whose length is exclusively determined by the time required for the injected mixture to set and for the rock salt to creep into and close shrinkage voids that develop in the set mixture, without regard to the establishment of thermal equilibrium in and surrounding the cavity; and thereafter sealing the cavity.

U.S. Pat. No. 7,097,386 to Maduell et al. describes a method for simultaneously developing caverns while depositing wastes or other materials in them. The method comprises drilling a well into a naturally occurring salt formation and initiating the development of a salt cavern by means of solution mining techniques so as to mine the formation of salt with water (seawater or fresh water). When the initial development of the salt cavern in this fashion has been carried out to an extent sufficient to accommodate the injection of a prescribed amount of such wastes or other materials into the cavern, injection of the wastes or other materials through the well is started while continuing to develop the cavern by solution mining techniques. The injection of the wastes or other materials may be carried out continuously (into the constant flow of solution mining water), or intermittently (at time intervals between successive injections of solution mining water). The proportion and rates of wastes or other materials and solution mining water injected into the well are monitored and regulated so that cavern development continues in a manner and at a rate that allows the cavern to reach an intended prescribed size while the wastes or other materials are injected and deposited into the cavern.

U.S. Pat. No. 7,156,579 to Castle et al. describes a process for manufacturing underground caverns suitable for storage of large volumes of gaseous or liquid materials. The method is an acid dissolution process that can be utilized to form caverns in carbonate rock formations. The method can also be utilized to form calcium chloride as a by-product of the cavern formation process. The method includes the steps of drilling a first well into a subterranean formation comprising carbonate rock; pumping a low viscosity aqueous acid solution through the first well; ejecting the aqueous acid solution from the first well to contact carbonate rock of the formation; reacting the aqueous acid with the carbonate rock to form reaction products comprising salt in an aqueous solution and carbonic acid, wherein the carbonic acid is in equilibrium with carbon dioxide; and removing the reaction products from the subterranean formation to form a cavern defined by the remaining subterranean formation.

There remains a need for improvements in development and maintenance of salt caverns for storage and disposal of materials produced during natural resource extraction.

SUMMARY OF THE INVENTION

One aspect of the present invention is a method for controlling the rate of growth of a salt cavern in a salt formation, the method comprising: a) pumping wash water into the salt formation to dissolve salt and grow the salt cavern; b) desalinating brine emerging from the salt formation, thereby providing a stream of saline water, a stream of non-saline water and a stream of salt; c) recycling and combining the stream of saline water with make up water, thereby providing salinated wash water and reducing demand for make up water; d) pumping the salinated wash water into the salt formation, wherein the salinated wash water provides a slower rate of growth of the salt cavern than the rate of growth provided by step a) and reduces demand for make up water; and e) repeating steps b) to d).

In certain embodiments, the method further comprises mixing the stream of non-saline water with the stream of saline water before performing step c).

In certain embodiments, the method further comprises, after step d), determining that the salt cavern is of sufficient size for waste storage, diverting at least a portion of the stream of non-saline water to an external process requiring non-saline water, mixing the stream of saline water with waste material to generate a waste material mixture, and repeating steps b) to d) with the waste material mixture instead of the makeup water, wherein at least a portion of the waste material pumped into the cavern sinks to the cavern's bottom for storage therein.

In certain embodiments, the external process is generation of steam by evaporators in a SAGD operation and the waste material is evaporator blowdown from the evaporators.

In certain embodiments, at least a portion of the salt is mixed with the salinated wash water prior to step d).

In certain embodiments, at least a separate portion of the salt is mixed with the salinated water before performing step c).

In certain embodiments, the method further comprises the step of reducing the pH of the waste material mixture to precipitate solids prior to step d).

In certain embodiments, the method further comprises the step of reducing the pH of the salinated wash water to precipitate solids prior to step d).

Another aspect of the present invention is a system for controlling the rate of growth of a salt cavern in a salt formation, the system comprising: a) a tank containing wash water for pumping into the salt formation to dissolve salt and form the salt cavern; b) a desalination unit for desalinating brine emerging from the salt formation, the desalination unit configured to provide a stream of saline water, a stream of non-saline water, and a stream of salt; c) a saline water recycling conduit for recycling the stream of saline water to a mixing point upstream of the tank; d) a supply of make up water for mixing with the stream of saline water at the mixing point to generate salinated wash water; and e) a conduit for carrying the salinated wash water to the tank for subsequent pumping of the salinated wash water into the salt cavern for slowing the rate of cavern growth and reducing demand for the make up water.

In certain embodiments, the system further comprises a non-saline water conduit for conveying the non-saline water to mix with the saline water in the saline water recycling conduit.

In certain embodiments, the system further comprises a conduit for diverting at least a portion of the stream of saline water to mix with waste material to produce a waste material mixture and further comprising a conduit for replacing the supply of make up water with the waste material mixture to generate salinated wash water containing the waste material.

In certain embodiments, the waste material mixture is evaporator blowdown.

In certain embodiments, the system further comprises a first salt recycling conduit for conveying salt from the salt stream to the stream of saline water.

In certain embodiments, the system further comprises a second salt recycling conduit for conveying the salt from the salt stream to the tank.

In certain embodiments, the system further comprises an injector for injecting acid into the waste material mixture.

In certain embodiments, the system further comprises a module for reducing the pH of the salinated wash water.

Another aspect of the present invention is a system for controlling the rate of growth of a salt cavern in a salt formation during a process for disposal of waste material in the cavern, the system comprising: a) a tank containing wash water for pumping into the salt formation to dissolve salt and form the salt cavern; b) a desalination unit for desalinating brine emerging from the salt formation, the desalination unit configured to provide a stream of saline water, a stream of non-saline water, and a stream of salt; c) a saline water recycling conduit for recycling the stream of saline water to a mixing point upstream of the tank; d) a conduit for diverting at least a portion of the stream of non-saline water to an external process requiring non-saline water, and e) a conduit for mixing the salinated wash water with waste material to produce a waste material mixture and a conduit for conveying the waste material mixture to the tank for subsequent pumping of the waste material mixture into the cavern.

In certain embodiments, the external process is generation of steam by evaporators in a SAGD operation and the waste material is evaporator blowdown from the evaporators.

In certain embodiments, the system further comprises a first salt recycling conduit for conveying salt from the salt stream to the stream of saline water.

In certain embodiments, the system further comprises a second salt recycling conduit for conveying the salt from the salt stream to the tank.

In certain embodiments, the system further comprises a module for reducing the pH of the waste material mixture.

In certain embodiments, the system further comprises a module for reducing the pH of the salinated wash water in the salt cavern.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION OF THE INVENTION

Rationale

Figure 1:
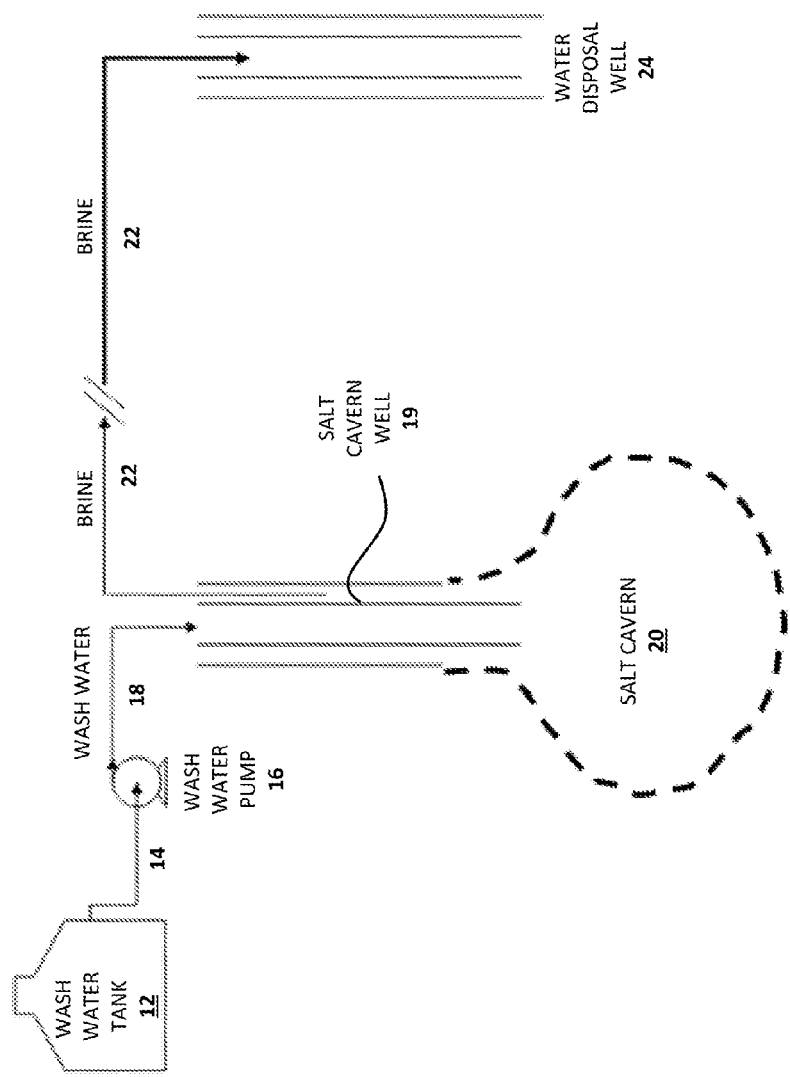
FIG. 1 is a schematic representation of a salt cavern development system according to the prior art.

Disposal of industrial wastes is a challenging problem. Disposal of such wastes in salt caverns provides one way to address this problem. In one notable application, steam-assisted gravity drainage (SAGD) for production of bitumen from oil sands formations requires operation of large scale evaporators to generate the high volumes of boiler feed water used to generate steam for bitumen extraction. The evaporators concentrate impurities in the water used for steam generation and these impurities are removed from the evaporators. This generates a volume of waste known as "evaporator blowdown." Disposal of the high volumes of evaporator blowdown generated at SAGD sites is a significant challenge. The use of salt caverns as disposal sites is one way to address this challenge but development and maintenance of salt caverns before and during the disposal process is accompanied by its own set of problems.

The systems currently in use for development of salt caverns in salt formations for the purpose of storage of hydrocarbons or waste are designed to perform a "once-through" process, wherein wash water is pumped into the salt formation and saline or brine at various degrees of salt saturation is returned and disposed of as the cavern grows to its desired dimensions. Problems with the present systems are encountered when water supplies and/or suitable wells for disposal of brine are not available in the vicinity of the candidate salt formation. In the past, these problems have been addressed at significant cost and effort by installing lengthy pipelines to link the systems with water supply and disposal wells.

Another problem with existing salt cavern disposal systems is that water entering the salt formation is undersaturated with salt and as a result, salt in the formation will be dissolved and the cavern will continue to grow until it reaches its limiting diameter. The cavern growth tends to occur relatively quickly and this problem has simply been accepted as a limitation of current cavern development processes.

The present invention addresses these two major shortcomings by providing desalination and recycling of saline water pumped out of a growing salt cavern and for adding saline water or salt to the input water to control the extent of salinity of the water entering the cavern. The recycling of water reduces the need for make-up water and disposal of brine and obviates the need for a disposal well. Although solid salts are generated by this process, disposal is less complicated and in some cases, such solids may be sold for refinement.

A number of alternative embodiments are briefly discussed in context of certain example embodiments. It is to be understood that the features of various alternative embodiments may be included in various combinations by the skilled person and that these combinations represent further embodiments understood by the skilled person to be within the scope of the invention.

Definitions

Although occasionally used to describe water saturated with salt, the term "brine" is used herein to refer to water containing at least 20% salt by mass.

As used herein, the term "saline" refers to water containing salt at a concentration greater than about 0.5% and less than about 20% by mass.

As used herein, the term "non-saline water" refers to water containing less than about 0.5% salt by mass.

As used herein, the terms "solution mining" and "in situ leaching" are synonymous and refer to a process used to recover water soluble salts as products from a salt formation using water and/or saline solutions. These terms are to be considered distinct from the term "salt cavern development" which, refers to development of a cavern in a salt formation in a controlled manner for the purpose of storage of hydrocarbon products or wastes, wherein the salts removed from the cavern are recycled or otherwise disposed of.

As used herein, the term "salt cavern" refers to an underground reservoir formed by a process of salt cavern development, as defined above. Salt caverns are suitable for storage of hydrocarbon products or wastes.

As used herein, the term "saturation" or "saturated" refers to the condition wherein a particular solute such as a salt is dissolved in a solvent to its maximum concentration such that the solvent can no longer dissolve any additional amount of that solute. The skilled person understands that a solution may be saturated with respect to one solute while it remains unsaturated with respect to another solute.

The term "salt" in its broadest sense refers to an ionic compound resulting from the combination of related numbers of cations with anions such that the combined entity is electrically neutral. In solution, salts separate into their component ions. As used herein, the term "salt" refers to one or more salts either present in a given salt formation, contained in a saline solution extracted from a salt formation, or in the solid form after having been precipitated by a desalination process. The most common salts of salt formations are sodium chloride, potassium chloride and other sodium and potassium salts such as carbonate, sulfate, nitrate and permanganate salts, for example.

As used herein, the term "desalination" refers to any process for removal of dissolved salts from water.

As used herein, the term "wash water" refers to water used for washing the salt cavern. Wash water may be non-saline water, saline water such as non-potable water, greywater or water which is salinated to some extent but not fully saturated with salt. Wash water may contain wastes designated for disposal in a salt cavern.

As used herein the term "salinated wash water" refers to wash water containing salt but not saturated with salt. Pumping of salinated wash water into a salt cavern will cause the cavern to grow more slowly than pumping of non-saline water.

As used herein, the term "make up water" is water which is combined with saline water to prepare salinated wash water, or which is used to simply add to the water tank of the system of certain embodiments of the invention.

As used herein, the term "blowdown" refers to water which is intentionally blown out of an evaporator to avoid concentration of impurities during continuous evaporation. Continuing evaporation of water concentrates dissolved impurities leading to scale deposits on the heat exchange surfaces and the precipitated solids concentrate leading to fouling and plugging of pipes and equipment, thereby reducing the evaporator performance and efficiency. Blowdown is performed to expel the impurities in order to avoid these problems.

Description of Embodiments

Various aspects of the invention will now be described with reference to the figures. A number of possible alternative features are introduced during the course of this description. It is to be understood that, according to the knowledge and judgment of persons skilled in the art, such alternative features may be substituted in various combinations to arrive at different embodiments of the present invention. Wherever possible, similar reference numerals are used to refer to similar features.

Referring now to FIG. 1, there is shown a schematic representation of a salt cavern development system which is known in the prior art. This system includes a wash water tank 12 connected via a conduit 14 to a wash water pump 16. The wash water pump 16 is provided to draw wash water from the wash water tank 12 and send it via conduit 18 into a salt cavern well 19 to the salt cavern 20. The wash water used in this prior art system has low salinity, if any. The skilled person will understand that water with low salinity will be more effective at dissolving salt present in the salt formation and subsequently carrying it out of the formation through the action of the wash water pump 16.

The saline water exiting the salt cavern 20 via conduit 22, which may be referred to as "brine" may have a wide range of concentrations of salts, depending upon various conditions used in the process. For example, the rate of pumping of wash water, the temperature of the wash water, the temperature of the salt cavern 20, and the composition of salts and other minerals contained in the salt cavern 20. However, in most cases, the brine pumped out of the salt cavern 20 is usually under-saturated (i.e. the solution can still dissolve additional salt). In this prior art system, the under-saturated brine is pumped via conduit 22 into a water disposal well 24 which may be located quite far from the salt cavern development system because sites for preparation of such a disposal well 24 have a number of requirements and the geological features in the vicinity of the salt cavern development system may not be suitable. For example, preparation of a disposal well 24 in a relatively porous formation may end up contaminating an overlying aquifer. If an appropriate disposal well is located far from the salt cavern development system, the brine must be transported by a pipeline and such an arrangement is accompanied by significant cost and infrastructure requirements.

In addition, the prior art system is not provided with a way to limit the rate of growth of the cavern, other than perhaps controlling the pumping rate or the temperature of the wash water. If the wash water has relatively low salt content, it will have a greater capacity to dissolve the salts on the walls of the cavern and this increases the likelihood that the diameter of the cavern will grow too fast and surpass its diameter limits.

The previously described shortcomings of the prior art systems are addressed by certain embodiments of the present invention.

Figure 2A:
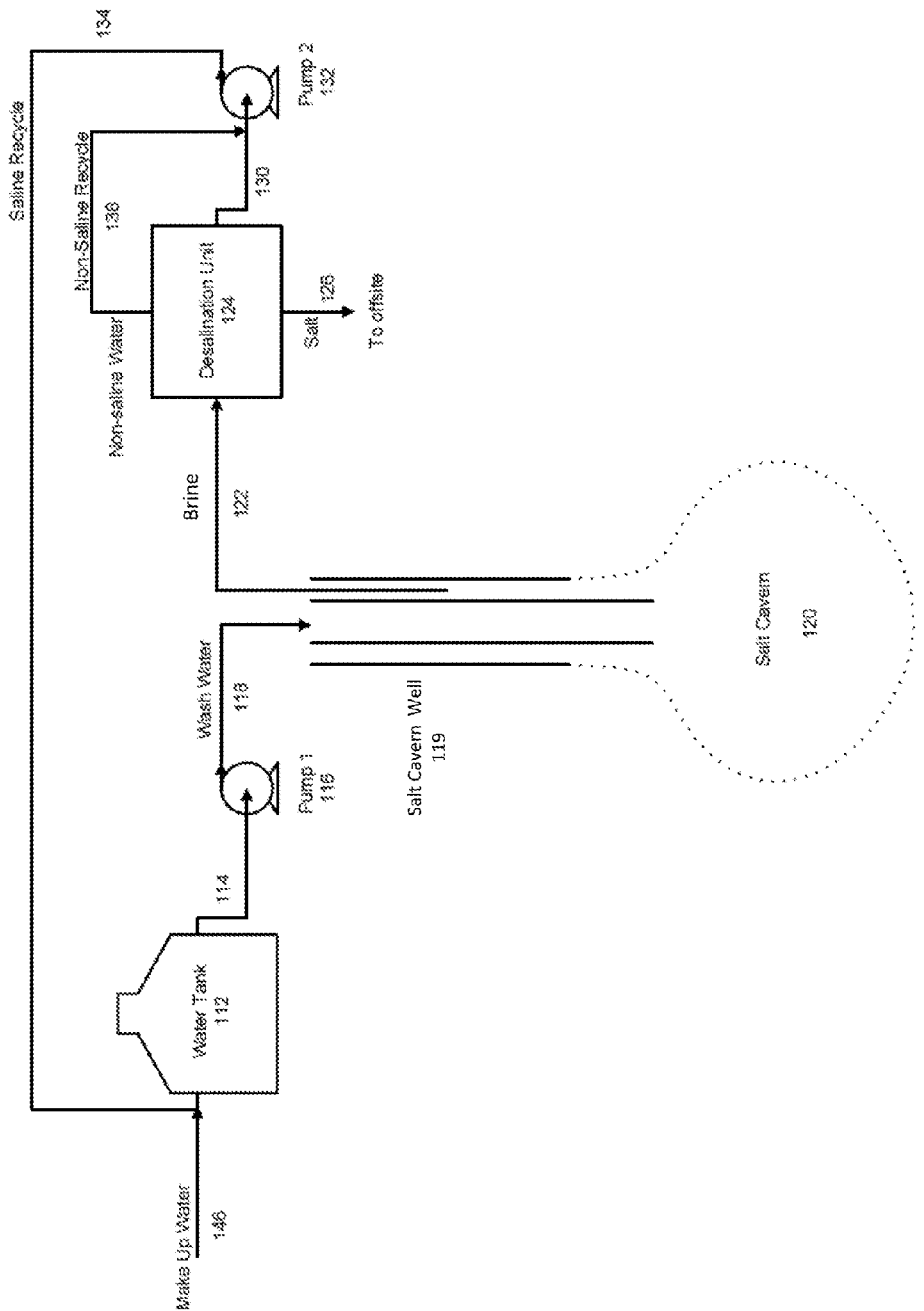
FIG. 2A is a schematic representation of a salt cavern development system according to one embodiment of the present invention which includes a desalination unit and recycling of non-saline and saline water.

Referring now to FIG. 2A, there is shown a cavern development and disposal system which is provided with a recycling system. The features of this system are described using reference numerals in the 100 series.

The operation of the system is now described beginning at the wash water tank 112. Wash water is pumped from wash water tank 112 by wash water pump 116 (pump 1) via conduit 114 and subsequently travels through conduit 118 to salt cavern well 119 and then enters the salt cavern 120. The skilled person will recognize that at the beginning of the process, there may not be a void or cavern present in the formation until the wash water begins to dissolve the salt immediately at the down-hole end of the well. In such cases, however, the cavern will begin to form as the wash water dissolves the salt and carries it out as brine via conduit 122. This brine which is under-saturated with salt in most cases, is then sent via conduit 122 to a desalination unit 124.

In this particular embodiment, a stream of solid salt is conveyed from the desalination unit 124 via conduit 126 for disposal or sale. In addition, a saline solution is conveyed from the desalination unit 124 via conduit 130.

In this particular embodiment of the salt cavern development system, recycling of saline water and non-saline water is provided.

The saline solution is conveyed from the desalination unit by the action of recycle pump 132 (pump 2) which then conveys the saline solution back to the wash water tank 112 via conduit 134 after mixing with a stream of make up water 146. This action increases the salinity of the water in the wash water tank 112. When water of higher salinity (as a result of the input of saline water via conduit 134) is then pumped into the salt cavern 120 by wash water pump 116 and conduits 114 and 118, the rate of salt cavern growth will be reduced because the higher salinity water has less capacity to dissolve salt. This provides a useful strategy for controlling the growth of the salt cavern 120 because it is not desirable to have a salt cavern grow too quickly. The volume of make up water mixed with the saline recycle stream 134 is used to adjust the salinity to control the subsequent rate of growth of the cavern.

In FIG. 2A, the non-saline solution leaving the desalination unit 124 via conduit 138 is recycled back to mix with the saline water in conduit 130.

Figure 2B:
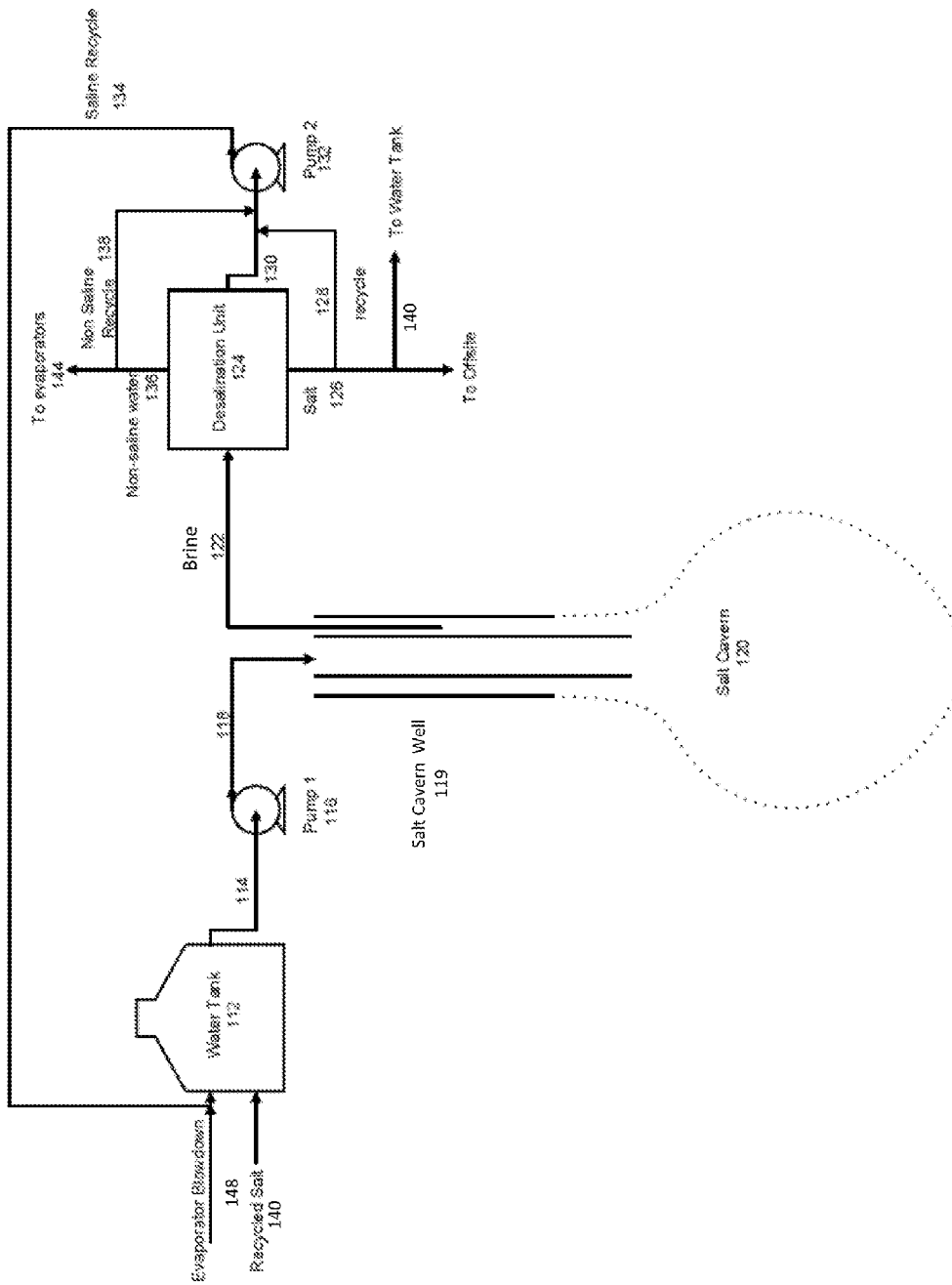
FIG. 2B is a schematic representation of a salt cavern disposal system that can be operated alone or integrated with the system illustrated in FIG. 2A. The stream of non-saline water or a portion thereof is routed to evaporators.

Turning now to FIG. 2B, there is shown a system for disposal of solid waste which in this particular embodiment is evaporator blowdown, but which may in principle be any type of solid waste suited for disposal in a salt cavern. This system may be considered a stand-alone system for use with a pre-existing mature salt cavern or as an extension of a salt cavern development system such as the system of FIG. 2A. In the latter embodiment, a valve (not shown) is provided to divert at least part of the non-saline recycle stream 138 of FIG. 2A to the evaporators, or to any other consumers of non-saline water, via conduit 144.

Saline water of conduit 134 mixes with the evaporator blowdown and the resulting mixture is sent to the water tank 112 via conduit 148. In addition, solid salt may be conveyed to the water tank 112 via conduit 140 to make the cavern wash water more saline to reduce the rate of growth of the cavern 120.

The various insoluble impurities present in the evaporator blowdown will sink to the bottom of the cavern 120 so that they do not pose a significant problem by re-emerging in the brine in conduit 122 and re-enter the desalination unit 124 in a subsequent cycle.

In certain embodiments, the evaporator blowdown pH is reduced, the rate of precipitation of impurities originating from the evaporator blowdown increases and the concentrations of any soluble impurities re-emerging in conduit 122 and subsequently recycled are low enough to not pose a significant problem. In these embodiments, modifications with appropriate valves and equipment to reduce the evaporator blowdown pH are provided in pH adjustment modules according to process engineering configurations known to the skilled person.

In certain embodiments, a computer control system is provided (not shown) which is configured to receive sensor output which provides a measure of salinity in all conduits and is programmed to automatically divert and mix water so that desired salinity parameters are achieved in water entering and exiting the wash water tank 112 and the entering and exiting the desalination unit 124. In such embodiments, automated valves are provided to send water through the appropriate conduits to achieve one or more desired levels of salinity at one or more locations of the system. The skilled person can assemble such automated control systems using various pumps, switching valves, sensors and custom programmed processors for this purpose without undue experimentation.

The skilled person will recognize that a number of alternative embodiments are possible. For example, instead of having a separate salt stream and a saline stream from the desalination unit, the desalination unit may be configured to only provide a saline stream or only provide a salt stream. The choice of configuration may depend on a number of factors such as the solubility of the salts of the formation, the temperature of the formation and the pressure of injection of the wash water, among others.

The skilled person will also recognize that while the embodiment illustrated in FIG. 2B describes disposal of evaporator blowdown, other wastes suitable for disposal in salt caverns may also be disposed of using the system and method of the present invention.

Equivalents and Scope

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to embodiments thereof, it will be understood by those skilled in the art that various changes in form and details may be made therein without departing from the scope of the invention encompassed by the appended claims.

The invention claimed is:

1. A method for controlling the rate of growth of a salt cavern in a salt formation, the method comprising:
   a) pumping wash water into the salt formation to dissolve salt and grow the salt cavern;

b) desalinating brine emerging from the salt formation, thereby providing a stream of saline water, a stream of non-saline water and a stream of salt;
c) mixing at least a portion of the stream of salt with the stream of saline water;
d) recycling and combining the stream of saline water with make up water, thereby providing salinated wash water and reducing demand for the make up water;
e) pumping the salinated wash water into the salt formation, wherein the salinated wash water provides a slower rate of growth of the salt cavern than the rate of growth provided by step a) and reduces demand for the make up water; and
f) repeating steps b) to e).

2. The method of claim 1, further comprising mixing the stream of non-saline water with the stream of saline water before performing step d).

3. The method of claim 1, further comprising, after step e), determining that the salt cavern is of sufficient size for waste storage, diverting at least a portion of the stream of non-saline water to an external process requiring non-saline water, mixing the stream of saline water with waste material to generate a waste material mixture, and repeating steps b) to e) with the waste material mixture instead of the makeup water, wherein at least a portion of the waste material pumped into the cavern sinks to the cavern's bottom for storage therein.

4. The method of claim 3 wherein the external process is generation of steam by evaporators in a SAGD operation and the waste material is evaporator blowdown from the evaporators.

5. The method of claim 3, further comprising the step of reducing the pH of the waste material mixture to precipitate solids prior to step e).

6. The method of claim 3, further comprising the step of reducing the pH of the salinated wash water to precipitate solids prior to step e).

7. The method of claim 1, wherein at least a separate portion of the salt is mixed with the stream of saline water before performing step d).

8. A system for controlling the rate of growth of a salt cavern in a salt formation, the system comprising:
   a) a tank containing wash water for pumping into the salt formation to dissolve salt and form the salt cavern;
   b) a desalination unit for desalinating brine emerging from the salt formation, the desalination unit configured to provide a stream of saline water, a stream of non-saline water, and a stream of salt;
   c) a saline water recycling conduit for recycling the stream of saline water to a mixing point upstream of the tank;
   d) a supply of make up water for mixing with the stream of saline water at the mixing point to generate salinated wash water;
   e) a conduit for carrying the salinated wash water to the tank for subsequent pumping of the salinated wash water into the salt cavern for slowing the rate of cavern growth and reducing demand for the make up water; and
   f) a first salt recycling conduit for conveying a portion of salt from the stream of salt to the stream of saline water.

9. The system of claim 8, further comprising a non-saline water conduit for conveying the non-saline water to mix with the saline water in the saline water recycling conduit.

10. The system of claim 8, further comprising a conduit for diverting at least a portion of the stream of saline water to mix with waste material to produce a waste material mixture and further comprising a conduit for carrying the waste material mixture to the water tank.

11. The system of claim 10, wherein the waste material is evaporator blowdown.

12. The system of claim 8, further comprising a second salt recycling conduit for conveying a second portion of salt from the salt stream to the tank.

13. The system of claim 10, further comprising an injector for injecting acid into the waste material mixture.

14. The system of claim 10, further comprising a module for reducing the pH of the salinated wash water.

15. A system for controlling the rate of growth of a salt cavern in a salt formation during a process for disposal of waste material in the cavern, the system comprising:
   a) a tank containing wash water for pumping into the salt formation to dissolve salt and form the salt cavern;
   b) a desalination unit for desalinating brine emerging from the salt formation, the desalination unit configured to provide a stream of saline water, a stream of non-saline water, and a stream of salt;
   c) a saline water recycling conduit for recycling the stream of saline water to a mixing point upstream of the tank;
   d) a conduit for diverting at least a portion of the stream of non-saline water to an external process requiring non-saline water,
   e) a conduit for mixing the saline water with waste material to produce a waste material mixture and a conduit for conveying the waste material mixture to the tank for subsequent pumping of the waste material mixture into the cavern and
   f) a first recycling conduit for conveying a portion of salt from the salt stream to the stream of saline water.

16. The system of claim 15, wherein the external process is generation of steam by evaporators in a SAGD operation and the waste material is evaporator blowdown from the evaporators.

17. The system of claim 15, further comprising a second salt recycling conduit for conveying a second portion of salt from the salt stream to the tank.

18. The system of claim 15, further comprising a module for reducing the pH of the waste material mixture.

19. The system of claim 15, further comprising a module for reducing the pH of the salinated wash water in the salt cavern.

20. A method for controlling the rate of growth of a salt cavern in a salt formation, the method comprising:
   a) pumping wash water into the salt formation to dissolve salt and grow the salt cavern;
   b) desalinating brine emerging from the salt formation, thereby providing a stream of saline water, a stream of non-saline water and a stream of salt;
   c) recycling and combining the stream of saline water with make up water, thereby providing salinated wash water and reducing demand for the make up water;
   d) pumping the salinated wash water into the salt formation, wherein the salinated wash water provides a slower rate of growth of the salt cavern than the rate of growth provided by step a) and reduces demand for the make up water; and
   e) repeating steps b) to d); and
   f) determining that the salt cavern is of sufficient size for waste storage, diverting at least a portion of the stream of non-saline water for generation of steam in a SAGD operation, mixing the stream of saline water with evaporator blowdown from evaporators in the SAGD operation to generate a waste material mixture, and repeating steps b) to d) with the waste material mixture instead of the makeup water, wherein at least a portion of the waste material pumped into the cavern sinks to the cavern's bottom for storage therein.

21. A system for controlling the rate of growth of a salt cavern in a salt formation during a process for disposal of waste material in the cavern, the system comprising:
   a) a tank containing wash water for pumping into the salt formation to dissolve salt and form the salt cavern;
   b) a desalination unit for desalinating brine emerging from the salt formation, the desalination unit configured to provide a stream of saline water, a stream of non-saline water, and a stream of salt;
   c) a saline water recycling conduit for recycling the stream of saline water to a mixing point upstream of the tank;
   d) a conduit for diverting at least a portion of the stream of non-saline water to a process for generation of steam in a SAGD operation, and
   e) a conduit for mixing the saline water with evaporator blowdown from evaporators in the SAGD operation to produce a waste material mixture and a conduit for conveying the waste material mixture to the tank for subsequent pumping of the waste material mixture into the cavern.

* * * * *